US010469822B2

(12) United States Patent
Varadarajan et al.

(10) Patent No.: US 10,469,822 B2
(45) Date of Patent: Nov. 5, 2019

(54) SCALABLE DISTRIBUTED COMPUTATION FRAMEWORK FOR DATA-INTENSIVE COMPUTER VISION WORKLOADS

(71) Applicant: Oracle International Corporation, Redwood Shores, CA (US)

(72) Inventors: Venkatanathan Varadarajan, Austin, TX (US); Arun Raghavan, Belmont, CA (US); Sam Idicula, Santa Clara, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 178 days.

(21) Appl. No.: 15/471,710

(22) Filed: Mar. 28, 2017

(65) Prior Publication Data

US 2018/0288384 A1    Oct. 4, 2018

(51) Int. Cl.
*H04N 13/128*        (2018.01)
*G06T 7/593*         (2017.01)
*H04N 13/00*         (2018.01)

(52) U.S. Cl.
CPC .......... *H04N 13/128* (2018.05); *G06T 7/593* (2017.01); *G06T 2200/28* (2013.01); *G06T 2207/10012* (2013.01); *H04N 2013/0081* (2013.01)

(58) Field of Classification Search
CPC . H04N 13/128; H04N 2013/0081; G06T 7/50
(Continued)

(56) References Cited

U.S. PATENT DOCUMENTS 10,116,918  B2 * 10/2018  Nagata .................... G06T 7/593
2010/0103249 A1 *  4/2010  Lipton .................... G06T 15/00
                                                                  348/51

OTHER PUBLICATIONS

White et al., "Web-Scale Computer Vision using MapReduce for Multimedia Data Mining", MDMKDD'10, dated Jul. 25, 2010, 10 pages.

(Continued)

*Primary Examiner* — Daniel G Mariam
(74) *Attorney, Agent, or Firm* — Hickman Palermo Becker Bingham LLP

(57) ABSTRACT

Techniques described herein provide methods and systems for scalable distribution of computer vision workloads. In an embodiment, a method comprises receiving, at each of a first node and a second node of a distributed system of nodes, two images. The first image comprises a first set of pixels and the second image comprising a second set of pixels. The method further comprises shifting, at the first node, each pixel of the first set of pixels of the first image in a uniform direction by a first number of pixels to form a first shifted image and shifting, at the second node, each pixel of the first set of pixels of the first image in the uniform direction by a second number of pixels to form a second shifted image. The second number of pixels is different from the first number of pixels. The method further comprises overlaying each of the first shifted image and the second shifted image with the second image, such that each pixel of the first shifted image and second shifted image has a corresponding pixel in the second image. The method further comprises creating, at the first node, a first disparity map that indicates, for each pixel of the first shifted image, a level of similarity between the pixel of the first shifted image and the corresponding pixel in the second image and creating, at the second node, a second disparity map that indicates, for each pixel of the (Continued)

second shifted image, a level of similarity between the pixel of the second shifted image and the corresponding pixel in the second image.

24 Claims, 5 Drawing Sheets

(58) Field of Classification Search
USPC .................................................. 382/154, 218
See application file for complete search history.

(56) References Cited

OTHER PUBLICATIONS

Venkata et al., "SD-VBS: The San Diego Vision Benchmark Suite", IEEE, dated 2009, IISWC, 10 pages.
Thomas et al., "CortexSuite: A Synthetic Brain Benchmark Suite", IISWC, IEEE, dated 2014, 9 pages.
Rabenseifner et al., "Hybrid MPI/OpenMP Parallel Programming on Clusters of Multi-Core SMP Nodes", dated 2009 17th Euromicro International Conference, 10 pages.
Kjær-Nielsen, "A two-level real-time vision machine combining coarse- and fine-grained parallelism", Journal of Real-Time Image Processing 5.4, dated 2010, 14 pages.
Dean et al., "The Tail at Scale", Communicaitons of the ACM 56, dated 2013, 7 pages.
Balaji et al., "Fine-Grained Multithreading Support for Hybrid Threaded MPI Programming", International Journal of High Performance Computing Applications 24.1, dated 2010, 14 pages.

* cited by examiner

SCALABLE DISTRIBUTED COMPUTATION FRAMEWORK FOR DATA-INTENSIVE COMPUTER VISION WORKLOADS

FIELD OF THE DISCLOSURE

Embodiments relate to computer vision and, more specifically, to distributing computer vision workloads across nodes in a distributed system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer vision is a field involving acquiring, processing, and analyzing digital images. Computer vision workloads are often data-intensive and are memory bandwidth-bound rather than compute-bound. For this reason, a common approach to parallelizing computer vision workloads is to split parts of the images into "tiles" and assign the tiles across multiple cores within a single node. Commodity hardware provides the necessary high-memory bandwidth with low-memory access latency for such computer vision workloads. The memory bandwidth requirement stems from the need for several stages of synchronization of computation across cores. However, extending the same approach to parallelism across multiple nodes is inefficient because, in multi-node systems, the inter-node network communication latency is orders of magnitude higher than the memory latency within a single node.

For example, in computing disparity for stereo vision, there are sequences of computer vision kernels performing a few basic integer arithmetic and comparison operations per pair of pixels from two images. An example operation is computing absolute differences between two grayscale pixels. There are also similar data intensive computer vision workloads that have similar problems such as feature tracking and motion estimation. Parallelizing such memory or data intensive workloads across multiple nodes is often challenging and non-trivial.

Data-intensive computer vision workloads (such as stereo vision and object and feature tracking) take one or more images as input with certain workload parameters that define how the one or more images should be processed. There are several challenges in efficiently parallelizing such a workload across multiple nodes.

For example, one approach splits the one or more images into tiles, distributes the tiles across several nodes, and performs parallel computation on the tiles. However, this requires multiple stages of synchronization (including communication of instructions) and non-negligible data communication between nodes. This may be manageable when the workload is parallelized across multiple cores within a single node, where the performance is only limited by the memory bandwidth and access latency or when only a small cluster of nodes (e.g., 2-4 nodes) is involved. However, in a multi-node setup, the amount of synchronization and data communication and the resulting overhead becomes a significant bottleneck. Furthermore, the shared network performance is often unreliable with communication latencies orders of magnitude higher than the intra-node off-chip memory latency.

Parallelization is also particularly difficult in situations when there is a high data movement-to-compute ratio. Although synchronization overhead exists for any workload, it is exacerbated in data-intensive computer vision workloads when the amount of compute per data moved is very low. In such cases, it is more difficult to hide high network latency behind compute costs when very small packets are exchanged that do not have enough compute to hide the associated network latency.

Another approach involves extending single node fine-grained parallelism across multiple nodes using general purpose inter-node communication primitives like send, receive, broadcast, scatter, gather, and reduce. This type of extension is inefficient especially for computer vision workloads that exhibit regular and large data communication patterns that cannot be efficiently implemented using the communication primitives. Thus, achieving scalability across multiple nodes becomes challenging and non-trivial for such data-intensive computer vision workloads.

Thus, there is a need for an approach that utilizes parallelism across cores and nodes and a specialized set of communication primitives between nodes for building a scalable platform for parallelizing data-intensive computer vision workloads.

Figure 1:
FIG. 1 is an illustration of a disparity map created from two images.
Figure 1:
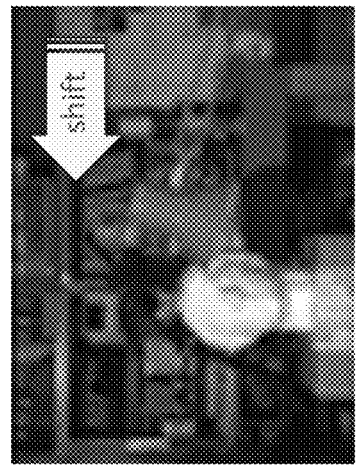

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" may be used to differentiate elements, but the modifiers do not necessarily indicate any particular order. For example, a second memory may be so named although, in reality, it may correspond to a first, second, and/or third memory.

General Overview

For computer vision workloads, a cluster computing node ("node") may be used to receive and process images and transmit results to other nodes via the network card. The amount of time required to process an image at a node is typically much less than the time required to transfer results between nodes. Thus, it is beneficial to limit the amount of data transfer between nodes as well as to overlap the time spent processing data with the time spent transferring data. That is, rather than processing data (also referred to herein as "computing") and transferring data at separate times, some data should be processed while other data is being transferred as much as possible. These benefits are achieved at least in part through use of what is referred to herein as "hybrid parallelism."

Hybrid Parallelism

While previous approaches have described splitting images into tiles (referred to herein as "fine-grained parallelism") and distributing the tiles across cores of a node, embodiments described herein are suitable for not only fine-grained parallelism but also distributing entire images to nodes (referred to herein as "coarse-grained parallelism") of a cluster for parallel processing across a network. The data-intensive nature of computer vision workloads is far more suited to approaches that utilize both fine-grained parallelism and coarse-grained parallelism (referred to herein as "hybrid parallelism") than previous approaches that relied merely on fine-grained parallelism.

In an embodiment, rather than assigning portions of images to individual nodes, work is split across input parameters. An input parameter is a variable used as input for a computer process. Each input parameter may be a unique value used for modifying one or more input images. For example, in a computer vision workload called Disparity, one type of input parameter is a "shift," or "shift value." A shift is a variable indicating a distance, in pixels, that an entire image is shifted in a uniform direction. In this example, a node receives two images of the same scene and one of the images may be shifted by a certain number of pixels. The node compares the shifted image and the un-shifted image pixel-by-pixel to determine how well the images match.

To split work across an input parameter, a given node can be assigned an entire image (or a large part of the image) for a range of values of the input parameter. Because the node is responsible for the entire image, less synchronization (e.g., communication of instructions and data) across the network is required. In this way, communication overhead is reduced.

To illustrate how work may be distributed based on input parameters, a specific example relating to Disparity computation for stereo vision, which is a computer vision algorithm, is discussed herein. The goal of the disparity computation is to create a disparity map that indicates the distance between two related pixels in a set of two images taken from the same point but at two different angles. The input of the Disparity computation comprises the two images along with a list of input parameters that configure the algorithm.

To efficiently parallelize the work, each node a cluster of nodes may be assigned a specific input parameter (such as a shift value) or a range of input parameters. Each node may then compare the two images across the assigned input parameter(s). For example, while one node compares the images in which one of the images is shifted by three pixels, another node compares the images in which the same image is shifted by five pixels. Shift values may range from zero to a maximum shift value, which may change from image to image. A cluster of nodes may determine an optimal shift value per individual pixel (referred to as a disparity map of the stereo image). This optimal shift value may be the shift that results in a closest match or highest level of similarity between the pixels of the two images.

In some instances, the number of nodes in a cluster may not be equal to the number of shifts. For example, if a maximum shift value is 32, a cluster that has more than 32 nodes cannot assign each node to a unique shift. In such cases, the shifts can be scaled to the number of nodes by hierarchically splitting a shift among a group of nodes. Within the group of nodes, the image is split among the nodes (fine-grained parallelism) and each node is responsible for processing a specific portion of the image using one or more assigned shift values.

Disparity Map

FIG. 1 is an illustration of a disparity map created from two images. Each of a first image 105 and a second image 110 depict a common scene but may have been taken from different angles. The second image 110 shifted with the goal of determining how well the shifted second image 110 matches the non-shifted first image 105. The level of similarity between the first image 105 and second image 110 is represented by numeric values in the disparity map 115. In the embodiment illustrated in FIG. 1, the level of similarity is measured per pixel and each numeric value in the disparity map 115 represents a level of similarity between a first pixel of the first image 105 and a corresponding second pixel of the second image 110. The particular pixel in the second image 110 that corresponds with the first pixel of the first image 105 may change depending on the shift that is applied to the second image 110. For example, with each shift, the first image 105 may be overlaid by the second 110 image and the individual pixel of the second image 110 that overlays the first pixel may be the corresponding pixel for that shift.

Level of similarity measurements may be calculated using one or more image kernels. A kernel is a mathematical function that applies a matrix of values to a set of pixel values in an image to modify the pixel values. Kernels can be applied for a variety of purposes, including sharpening and blurring an image. In this case, image kernels are used to create the disparity map 115 using the first image 105 and the second image 110.

Disparity computation may involve two main steps. First, one of two input images is shifted by x pixels, where x is a value between zero and a maximum shift value. Second, several image kernels are computed between the two input images to create a disparity map. This process is repeated for each shift value between zero and the maximum shift value. Thus, the work to compute disparity linearly increases with the maximum shift value.

A final disparity map is computed by aggregating all of the disparity maps to determine a minimum disparity value across all shifts per pixel. In this way, when computing a disparity map over a cluster of nodes, network communication is needed only for aggregating the disparity maps created at each node and is not required in forming the disparity maps at each node. This provides a significant advantage over approaches that merely utilize fine-grained parallelism in that the majority of the computation is done locally without requiring any transfer of results between nodes. Moreover, in the hybrid system, result exchange for aggregation is batched together to capitalize on high network bandwidth. Batched communication also increases opportunities to overlap network latency with aggregation compute time.

Aggregating multiple disparity maps received from multiple nodes may result in a high transfer cost to compute cost ratio. Transfer cost is the time required to transfer data (e.g., a disparity map) between nodes and compute cost is the time required to perform computations (e.g., creating a disparity map or aggregating multiple disparity maps) at nodes. To counteract this, embodiments utilize aggregation network communication primitives and per node aggregation runtime, which are each discussed in further detail herein. The goal of each of these components is to increase efficiency by hiding communication overhead behind the compute time for aggregating results.

Aggregation Networks

Figure 2A:
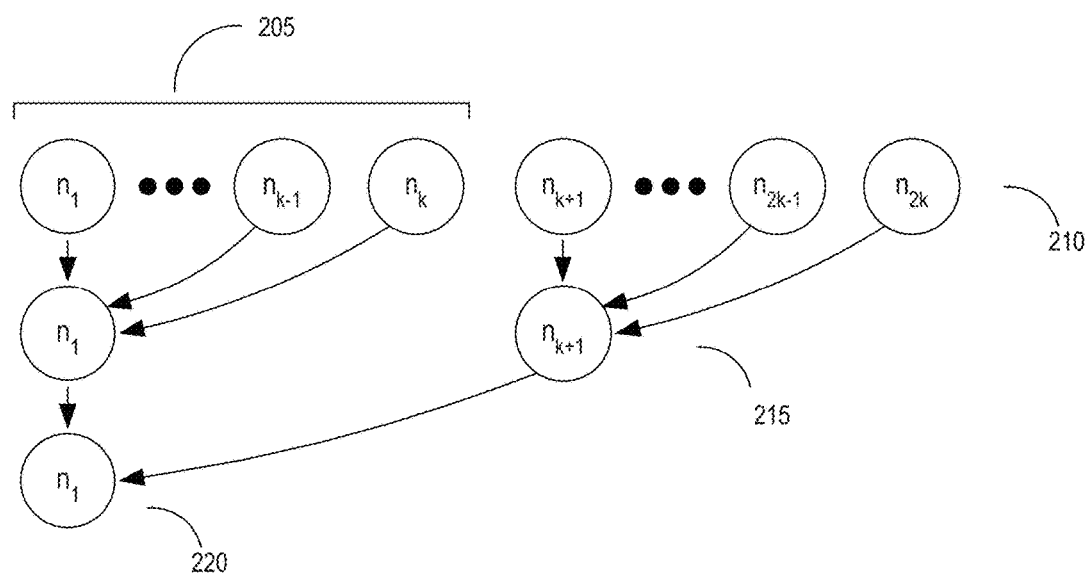
FIG. 2A illustrates an example tree aggregation network and FIG. 2B illustrates an example shuffle aggregation network.
Figure 2B:
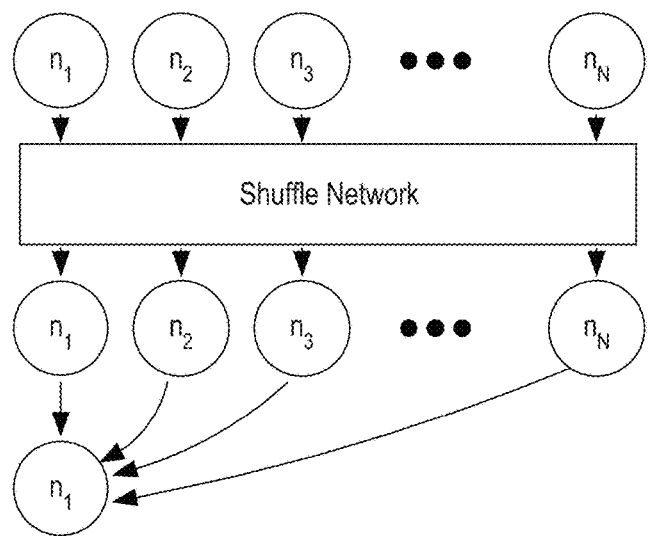

There are two types of aggregation networks that may be applied to efficiently parallelize a computer vision workload across a cluster of nodes. FIG. 2A illustrates an example tree aggregation network and FIG. 2B illustrates an example shuffle aggregation network. Either of these aggregation networks may be applied for a particular computer vision workload on a cluster of nodes, and selecting between the networks can be on a case-by-case basis. The two networks may perform differently depending on the type of aggregation required and the specific ratio of transfer cost to compute cost. Aggregation is performed after the individual nodes complete their assigned work (in our example, creating a disparity map using assigned shifts).

A tree aggregation network may rely on two parameters: width 205 and number of levels (in FIG. 2A, three levels: level A 210, level B 215, and level C 220). The width 205 represents how many child nodes are assigned to a single parent node. For example, in FIG. 2A, the results of node $n_1$ through $n_k$ are aggregated at $n_1$. Thus, the width for level A 210, is k. As shown, width can vary per level. For example, the width of level B 215 is only two nodes, the results of which are each aggregated at $n_1$. This enables adapting the network based on the aggregated result size. In computer vision workloads, the size of a result (output of a node) often remains constant before and after each result aggregation level.

The width 205 may be set by considering two factors: transfer cost and compute cost. Transfer cost is the time required to transfer disparity maps between nodes and is directly proportional to the size of the disparity map. Compute cost is the time to aggregate two disparity maps at a node. For example, if the time required to transfer a disparity map between nodes is higher than the time required to aggregate two disparity maps, a width 205 of more than two is recommended. This is because by increasing the number of disparity maps that are aggregated at each receiving node, the compute cost increases. Because the compute cost in this example is higher than the transfer cost, increasing the compute cost creates more overlap between compute cost and transfer cost, which improves overall efficiency. Moreover, a tree network with a higher tree width 205 may also require fewer levels.

A shuffle aggregation network, as illustrated in FIG. 2B, relies on splitting disparity maps into pieces. For example, a node in a cluster may split a disparity map created at the node into a number of pieces that equals the number of other nodes in the cluster. In this way, the node can send pieces of the disparity map created at the node to each other node in the cluster, while also receiving pieces of disparity maps created at the other nodes. In an embodiment, each piece received at a node may correspond to an identical portion of the two images used in creating the disparity maps. As discussed above, a piece of a disparity map indicates levels of similarity for one or more pairs of pixels in two images. Each node, other than a receiving node, may send a piece of the disparity map the node created that corresponds to the same set of pixels in the two images to the receiving node. The receiving node, similarly, may send all of the pieces of the disparity map created at the receiving node, except for the piece that corresponds to the same set of pixels in the two images, to all of the other nodes in the cluster. Finally, a node in the cluster may compile all of the pieces to form a final disparity map.

The choice between using a tree aggregation network and a shuffle aggregation network may be mainly dependent on the time required to transfer the results. In the case where disparity maps are the results, the shuffle aggregation network may work best because the disparity map is equivalent in size to the input images. The tree aggregation network, on the other hand, is best suited for cases where the aggregation results are smaller than their inputs, allowing the communication cost at each level of the aggregation network to be reduced.

In an embodiment, choosing between aggregation networks may be automated. Inputs to the automated system may include average size of results, time to complete one aggregation, and size of the resulting aggregation. These inputs can be extrapolated from the parameters of a computer vision algorithm. Alternatively, the inputs could be collected before the aggregation phase by a coordinator that collects the information and broadcasts it to the nodes in the cluster. In an embodiment, the coordinator may wait for only one node's result characteristic before deciding on a network such that a network-wide synchronization point is not required. Each node's result characteristic may also be stored at each node in order to avoid the cost of coordinating for future implementations.

The cost of aggregation for each network type can be computed through use of various formulas. For the tree aggregation network, the cost of aggregation is the cost of result aggregation per level multiplied by the number of levels. The cost of result aggregation per level is the time to first byte plus tree width multiplied by the sum of compute cost and transfer cost. The number of levels may be calculated by computing Log wN, where "W" is the tree width and "N" is the number of nodes in the cluster.

For the shuffle aggregation network, the cost of aggregation is cost of shuffle plus cost of result gather. Cost of shuffle is equivalent to: (N−1)*(compute cost+transfer cost)+TFB, where N is the number of nodes, and TFB is the time to first byte. Cost of result gather is equivalent to: (N−1)*transfer cost+TFB.

Because the shuffle aggregation network splits the results into N parts (where N is the number of nodes), the size of each result at each node in the shuffle aggregation network $1/N^{th}$ that of the tree aggregation network. In both networks, each node sequentially aggregates results from all nodes.

The values of compute cost and transfer cost are highly dependent on the workload and are characterized by the parameters of per node result size and compute cost. For the tree aggregation network, tree width can be optimized by setting it to the lower value of the number of cores per node and the transfer cost divided by the compute cost per unit of work (rounded down to the nearest integer).

Tree width should be set so as to overlap network transfer cost and compute cost. While the width can be theoretically high, the benefit from higher tree width diminishes when there is not enough computer power available on a single node. Aggregation result sizes may be significantly smaller than total network capacity.

Each node in a cluster has instructions to send a result to the appropriate aggregator node. For example, in FIG. 2A, node $n_1$ is the aggregator node (or "receiving node") for nodes $n_1$ through $n_k$ ("sender nodes"). In FIG. 2B, node $n_1$ is the aggregator node for a piece of the aggregation results of each of nodes $n_1$ through $n_N$. Similarly, each of the nodes in FIG. 2B is an aggregator node for pieces of the aggregation results from all other nodes. Because these instructions are set for each of the nodes, network-wide synchronization is not required. Moreover, each node may begin execution simultaneously or near-simultaneously.

Procedure Overview

Figure 3:
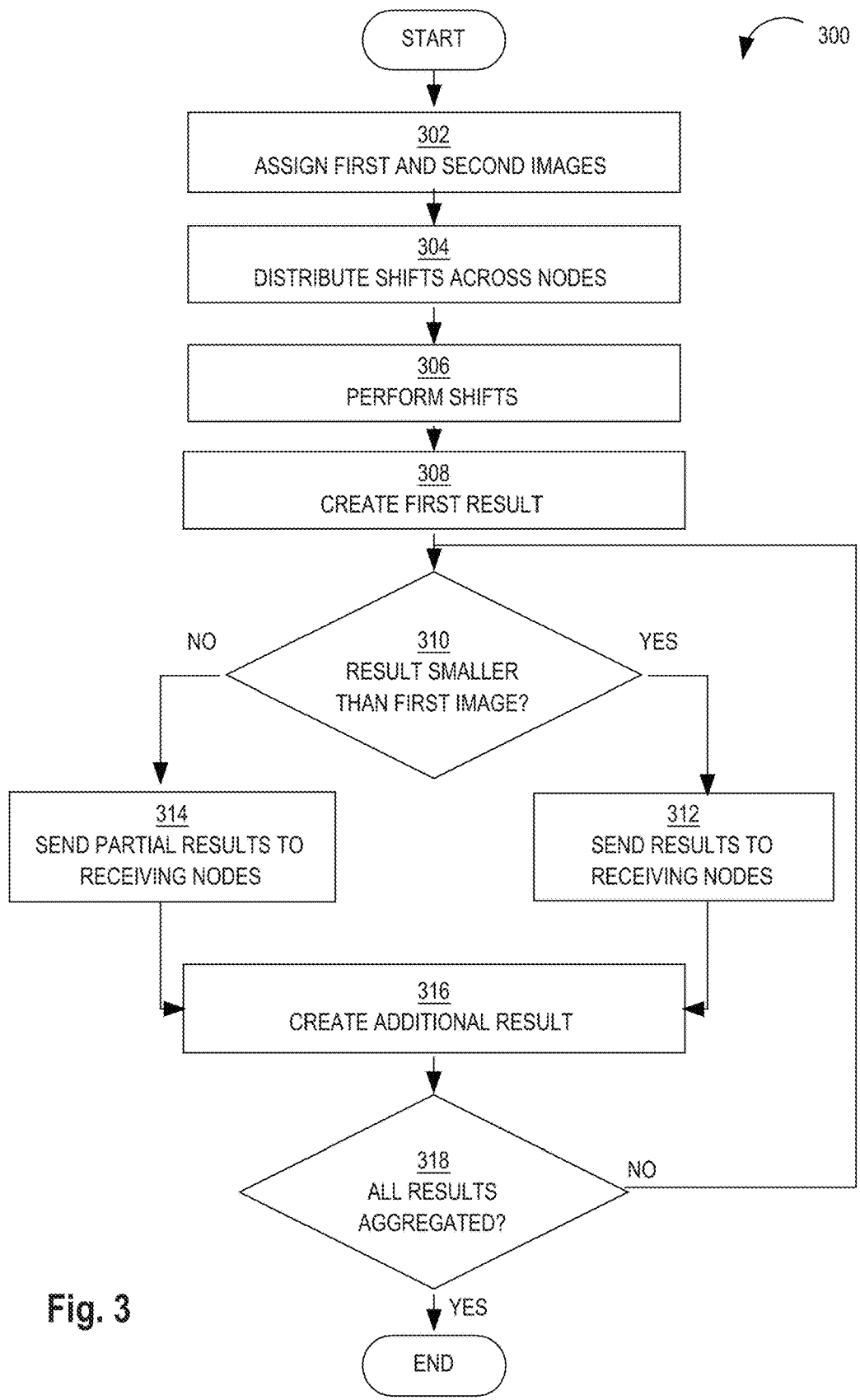
FIG. 3 is a flow diagram depicting a procedure for aggregating data across nodes.

FIG. 3 is a flow diagram depicting a procedure for aggregating data across nodes. To illustrate an example, the flow diagram shows how the procedure would be performed for computer vision workloads. However, this procedure may be utilized for any type of data and input parameters.

At step 302, first inputs (in this example, first and second images) are assigned to each node of a cluster of nodes.

At step 304, a set of input parameters (in this example, shift values) are distributed among the cluster of nodes. If the number of nodes in the cluster is the same as or less than the number of shift values, the shift values are distributed evenly among the cluster of nodes. If the number of nodes in the cluster exceeds the number of shifts, one or more shifts may be assigned to multiple nodes. For a shift assigned to a group of nodes, each node in the group may be responsible for evaluating the shift for a specific portion of the images.

At step 306, each node shifts the first image a distance specified by a shift value assigned to the node to create a shifted first image. Each shift may be in a uniform direction. The shift value may correspond to a number of pixels. That is, a shift value of three may indicate that a node assigned the shift value of three should shift the first image by three pixels.

At step 308, each node creates a first result (in this example, a disparity map) by performing a comparison between the shifted first image and the second image. The comparison may involve overlaying the second image with the shifted first image, or vice versa. Moreover, the comparison may be on a pixel-by-pixel basis. For example, each pixel of the second image that is overlaid by a pixel of the shifted first image may be compared to that pixel of the shifted first image. The comparison may involve computing a depth differential between pixels.

At step 310, it is determined whether the first result is larger than the first inputs. The determination may be based on a measurement in bytes or other unit of measurement. If the first result is smaller than the first inputs, the procedure 300 continues to step 312. If the first result is not smaller than the first inputs, the procedure 300 continues to step 314. In the case of computer vision workloads, the first result (disparity map) is the same size as each of the first inputs (first and second images). Thus, the procedure 300 would continue to step 314.

At step 312, the first results are sent to first receiving nodes. Some nodes that create first results are also receiving nodes. In such cases, the node would not send the first result but would receive other results and aggregate them with the node's result. This step corresponds to the tree aggregation network described herein.

At step 314, the first result is split into pieces and the pieces are sent to first receiving nodes. Each piece may have a designated receiving node that it is sent to. This step corresponds to the shuffle aggregation network described herein.

At step 316, a second result is created by aggregating the first result with other results received at the receiving node. Aggregating may involve determining a minimum value for each pixel across each of the first results.

At step 318, it is determined whether all results have been aggregated, or in other words, whether the final level of aggregation has been reached. For example, if a tree aggregation network is used, it is determined whether the result created at step 316 was created at the final level of the tree aggregation network. If not, the procedure may return to step 310 and the result created at step 316 may be sent to the corresponding receiving node to be aggregated with other results and an additional result may be created.

Per-Node Aggregation

In order to achieve near-linear scalability and high-performance in generating results at each node of a cluster, several techniques may be used. In one embodiment, if a result is large, a node may split the result into smaller portions that can be sent one at a time or in small groups and can be independently aggregated with other portions received at a receiving node. For example, if a result is several megabytes in size, the result may be split. Aggregating large results over a network incurs a high transfer cost over the network such that the compute cost would likely not be large enough to completely overlap with the transfer cost. By splitting larger results, the transfer cost of each portion in transit would overlap with the compute cost of another portion already received at the receiving node. Splitting results may not be possible for all workloads as aggregation of some portions may be dependent on the entire aggregation result. The decision of when to split an aggregation result may be based on amounts of network latency, aggregation compute requirements per work unit, and the overhead of splitting and merging the larger results across nodes.

In another embodiment, work performed at nodes is spread as evenly as possible across cores of the nodes. Spreading the work may involve a work-stealing approach using several processes called "workers" and a shared work-queue. There may be two types of workers at each node: (1) receive workers that listen over the network for incoming work units from other nodes and add the work into a shared work-queue; and (2) result aggregator workers that poll the shared work-queue, aggregate two work units, and add the result to a result queue.

There may be one worker per core with one receive worker and at most one result aggregator worker for each node in the cluster sending a packet to the receiving node (for example, one less than the total number of nodes in the cluster). Each worker is assigned to a separate core to avoid interference between the workers. Allocating independent hardware context for the receiving node and the workers enforces a fast path between the arrival of a work unit from the network and the aggregation of the network. Even without synchronization between sender nodes and receiver nodes, aggregation of results may occur in parallel because of the nature of computer vision workloads. The degree of parallelism is further enhanced when there are multiple smaller independent work units sent by a sender node. Apart from increasing the likelihood of parallel aggregations, splitting work across cores also hides the latency of network communication behind aggregation compute by workers. Work-stealing also naturally hides any infrequent and intermittent network jitters that may be caused by other nodes sharing the same network.

In another embodiment, nodes may avoid deserialization by performing in-place result aggregation and assigning incoming results to pre-allocated result buffers. For example, a node may have a network card that is responsible for directing incoming packets to a particular buffer. Typically, an incoming packet may be directed at first to a temporary buffer and then moved to a buffer where the packet will be processed. After the packet leaves the temporary buffer, the network card can direct a new incoming packet to the temporary buffer. Instead, once a first packet is assigned by the network card to a first buffer, the first packet is processed at the first buffer. The network card may be instructed that the first buffer is no longer available so that the network card does not attempt to assign any new packets to the first buffer. In this way, the cost of allocation/deallocation of temporary buffers for the packets is avoided.

Advantages Over Other Techniques

The embodiments described herein provide several advantage over other techniques, including near-linear scalability and performance improvement with increasing numbers of nodes in a cluster.

In one known technique, multiple instances of the same workload are run with different inputs such that workloads, including computer vision workloads, can be scaled over a cluster of nodes. This improves throughput and utilization of the cluster but does nothing to improve the response time of workload instance. To improve response time, a majority of techniques have focused on extracting performance from a single node by parallelizing the workload across several cores. This has been done using custom accelerators or using well-defined parallel programming models. However, the ability to scale to large clusters of nodes is essential for computer vision workloads that often quickly exhaust the limited resources available on a single node.

Data-intensive workloads like disparity (used in stereo vision), feature tracking, motion estimation, etc. are often assumed to be embarrassingly parallel. However, scaling to multiple nodes is hindered by some unique challenges, particularly the challenge of supporting efficient synchronization and data aggregation across nodes. Many known techniques adopt a hybrid Message Passing Interface (MPI) programming model across nodes and multi-processing within a node, but are often limited by the small set of primitives that these programming models provide especially for computer vision workloads. Implementation of such communication primitives are themselves complex and are general-purpose. Further, the supported communication primitives only provide the mechanism to each application and these primitives must be carefully arranged (often manually) to optimize for a particular workload (e.g., explicitly overlap communication with computation to improve scalability).

Map-reduce is another common framework that is employed for expressing distributed computation and it is also employed for distributing computer vision workloads across a cluster. Although it is possible to fit a complex computer vision workload into a simplistic map-reduce programming interface, it is known to perform poorly for performance-sensitive use cases.

Software Overview

Figure 4:
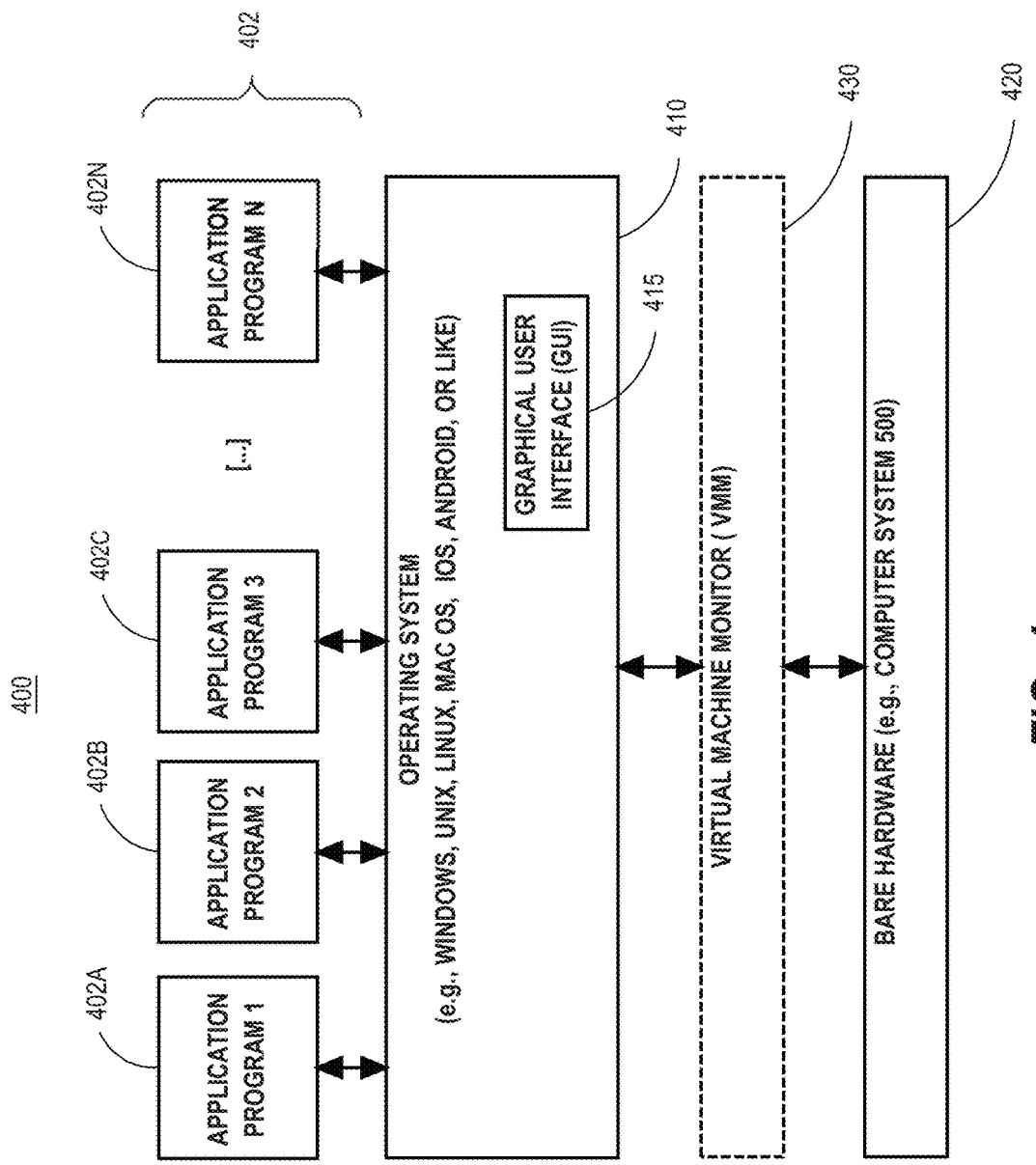
FIG. 4 is a block diagram of a basic software system that may be employed for controlling the operation of computing system 500.
Figure 5:
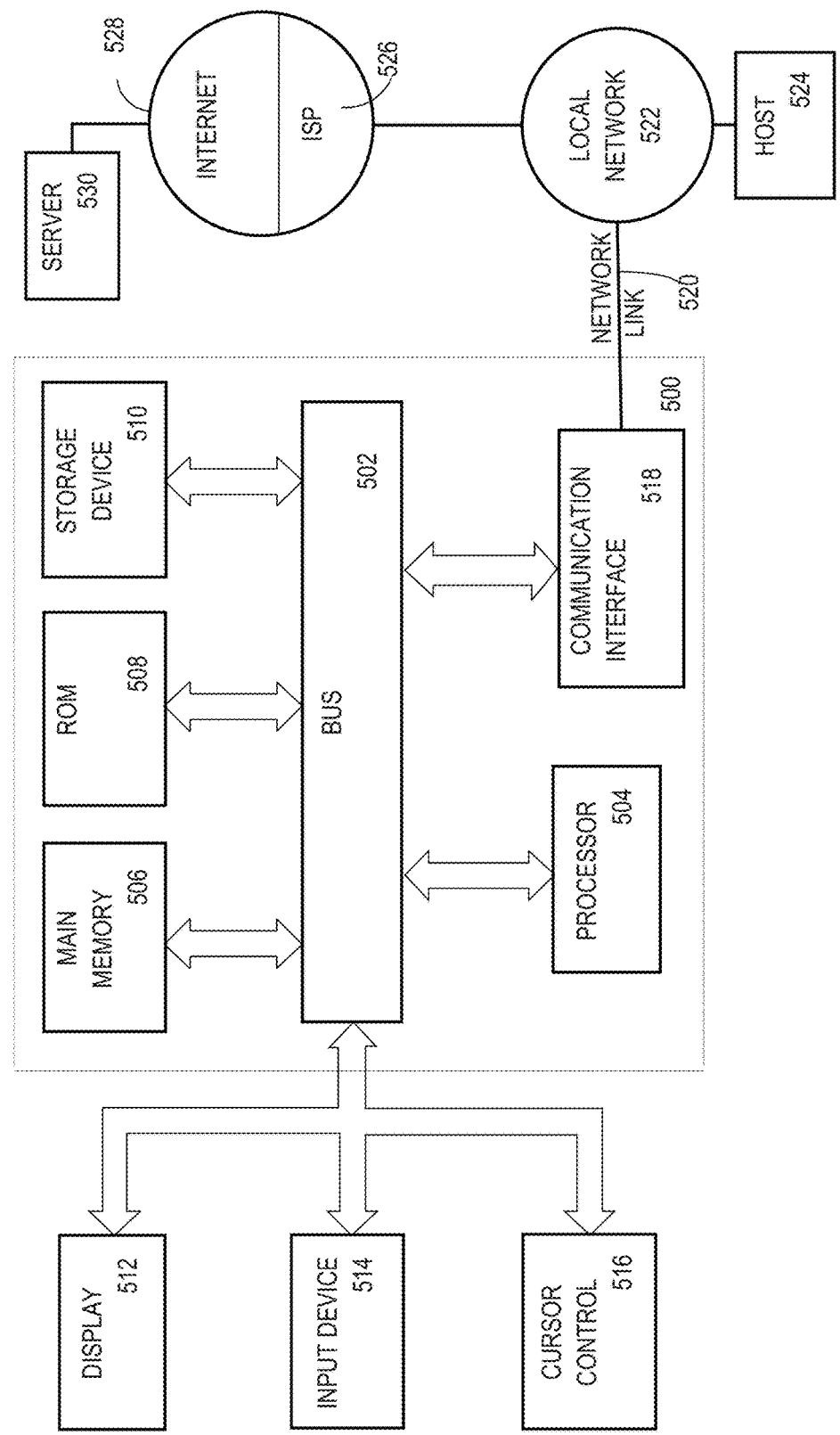
FIG. 5 depicts a computer system upon which an embodiment may be implemented.

FIG. 4 is a block diagram of a basic software system 400 that may be employed for controlling the operation of computing system 500 of FIG. 5. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computing system 500. Software system 400, which may be stored in system memory (RAM) 506 and on fixed storage (e.g., hard disk or flash memory) 510, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 510 into memory 506) for execution by the system 400. The applications or other software intended for use on computer system 500 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 504) of computer system 500. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 500.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 500 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 46 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 46, or other non-volatile storage for later execution.

Computing Nodes and Clusters

A computing node is combination of one or more hardware processors that each share access to a byte addressable memory. Each hardware processor is electronically coupled to registers on the same chip of the hardware processor and is capable of executing an instruction that references a memory address in the addressable memory and that causes the hardware processor to load data at that memory address into any of the registers. In addition, a hardware processor may have access to its separate exclusive memory that is not accessible to other processors. The one or more hardware processors may be running under the control of the same operating system A hardware processor may be comprise multiple core processors on the same chip, each core processor ("core") being capable of separately executing a machine code instruction within the same clock cycles as another of the multiple cores. Each core processor may be electronically coupled to connect to a scratch pad memory that cannot be accessed by any other core processor of the multiple core processors.

A cluster comprises computing nodes that each communicate with each other via a network. Each node in a cluster may be coupled to a network card or a network integrated circuit on the same board of the computing node. Network communication between any two nodes occurs via the network card or network integrated circuit on one of nodes and a network card or network integrated circuit of another of the nodes. The network may be configured to support remote direct memory access.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving, at each of a first node and a second node of a distributed system of nodes, two images comprising a first image and a second image, the first image comprising a first set of pixels and the second image comprising a second set of pixels;
   shifting, at the first node, each pixel of the first set of pixels of the first image in a uniform direction by a first number of pixels to form a first shifted image;
   shifting, at the second node, each pixel of the first set of pixels of the first image in the uniform direction by a second number of pixels to form a second shifted image, wherein the second number of pixels is different from the first number of pixels;
   overlaying each of the first shifted image and the second shifted image with the second image, such that each pixel of the first shifted image and second shifted image has a corresponding pixel in the second image;
   creating, at the first node, a first disparity map that indicates, for each pixel of the first shifted image, a level of similarity between the pixel of the first shifted image and the corresponding pixel in the second image;
   creating, at the second node, a second disparity map that indicates, for each pixel of the second shifted image, a level of similarity between the pixel of the second shifted image and the corresponding pixel in the second image.

2. The method of claim 1, further comprising:
   based, at least in part, on determining that the first disparity map is not smaller than the first image:
   receiving, at the first node, a portion of the second disparity map;
   creating, at the first node, a first piece of a third disparity map, the first piece indicating, for each pixel of a first subset of pixels, the highest level of similarity between the first disparity map and the second disparity map.

3. The method of claim 2, further comprising:
   receiving, at the first node, a second piece of the third disparity map created at a third node, the second piece indicating, for each pixel of a second subset of pixels of the first set of pixels, the highest level of similarity between the first disparity map, the second disparity map, and a third disparity map created at the third node.

4. The method of claim 3, further comprising:
   creating, at the first node, a final disparity map comprising the first piece and the second piece.

5. The method of claim 2, the first node comprising a set of cores, the method further comprising:
   receiving, at a first core of the set of cores, the portion of the second disparity map;
   assigning the received portion to a second core of the set of cores;
   creating, at the second core, the first piece of the third disparity map.

6. The method of claim 1, further comprising:
   based, at least in part, on determining that the first disparity map is smaller than the first image:
   receiving, at the first node, the second disparity map;
   creating, at the first node, a third disparity map indicating, for each pixel of the first set of pixels, the highest level of similarity between the first disparity map and second disparity map.

7. The method of claim 6, the first node comprising a set of cores, the method further comprising:
   receiving, at a first core of the set of cores, a first portion of the second disparity map;
   assigning the first portion to a second core of the set of cores;
   receiving, at the first core, a second portion of the second disparity map;
   assigning the second portion to a third core of the set of cores.

8. The method of claim 1, further comprising:
   receiving, at a third node of the distributed system of nodes, a first portion of the first image and the second image, the first portion comprising a first subset of the first set of pixels;
   receiving, at a fourth node of the distributed system of nodes, a second portion of the first image and the second image, the second portion comprising a second subset of the first set of pixels;
   shifting, at the third node, each pixel of the first subset of pixels of the first image in the uniform direction by a third number of pixels to form a first shifted portion;
   shifting, at the fourth node, each pixel of the second subset of pixels of the first image in the uniform direction by the third number of pixels to form a second shifted portion;
   overlaying each of the first shifted portion and the second shifted portion with the second image, such that each pixel of the first shifted portion and second shifted portion has a corresponding pixel in the second image;
   creating, at the first node, a third disparity map that indicates, for each pixel of the first shifted portion, a level of similarity between the pixel of the first shifted portion and the corresponding pixel in the second image;

creating, at the fourth node, a fourth disparity map that indicates, for each pixel of the second shifted portion, a level of similarity between the pixel of the second shifted portion and the corresponding pixel in the second image.

9. The method of claim 1, further comprising:
receiving, at a first buffer of the first node, the first portion of a first disparity map created at the first node and the second portion of a second disparity map created at the second node; and
comparing, at the first buffer of the first node, the first portion of the first disparity map created at the first node and the second portion of a second disparity map created at the second node.

10. A method comprising:
receiving, at each of a first node and a second node of a distributed system of nodes, a first image and a second image;
assigning one or more input parameters of a set of input parameters to the first node and the second node, wherein each of the first node and the second node is assigned at least one input parameter of the set of input parameters, and wherein each input parameter defines a unique value for modifying the second image;
applying, at the first node, an assigned input parameter to the received second image to create a first modified second image;
applying, at the second node, an assigned input parameter to the received second image to create a second modified second image;
comparing, at the first node, the first image and the first modified second image;
comparing, at the second node, the first image and the second modified second image;
creating, at the first node, a first result based on the comparing at the first node, the first image and the first modified second image;
creating, at the second node, a second result based on the comparing at the second node, the first image and the second modified second image.

11. The method of claim 10, further comprising:
based, at least in part, on determining that the first result is not smaller than the first image:
receiving, at the first node, a portion of the second result;
creating, at the first node, a first piece of a third result based on the first result and second result.

12. The method of claim 10, further comprising:
based, at least in part, on determining that the first result is not smaller than the first image:
receiving, at the first node, the second result;
creating, at the first node, a third result based on the first result and the second result.

13. One or more computer-readable storage media storing sequences of instructions, wherein said sequences of instructions, when executed by one or more hardware processors, cause:
receiving, at each of a first node and a second node of a distributed system of nodes, two images comprising a first image and a second image, the first image comprising a first set of pixels and the second image comprising a second set of pixels;
shifting, at the first node, each pixel of the first set of pixels of the first image in a uniform direction by a first number of pixels to form a first shifted image;
shifting, at the second node, each pixel of the first set of pixels of the first image in the uniform direction by a second number of pixels to form a second shifted image, wherein the second number of pixels is different from the first number of pixels;
overlaying each of the first shifted image and the second shifted image with the second image, such that each pixel of the first shifted image and second shifted image has a corresponding pixel in the second image;
creating, at the first node, a first disparity map that indicates, for each pixel of the first shifted image, a level of similarity between the pixel of the first shifted image and the corresponding pixel in the second image;
creating, at the second node, a second disparity map that indicates, for each pixel of the second shifted image, a level of similarity between the pixel of the second shifted image and the corresponding pixel in the second image.

14. The one or more computer-readable storage media of claim 13, the sequences of instructions further comprising instructions that, when executed by said one or more hardware processors, cause:
based, at least in part, on determining that the first disparity map is not smaller than the first image:
receiving, at the first node, a portion of the second disparity map;
creating, at the first node, a first piece of a third disparity map, the first piece indicating, for each pixel of a first subset of pixels, the highest level of similarity between the first disparity map and the second disparity map.

15. The one or more computer-readable storage media of claim 14, the sequences of instructions further comprising instructions that, when executed by said one or more hardware processors, cause:
receiving, at the first node, a second piece of the third disparity map created at a third node, the second piece indicating, for each pixel of a second subset of pixels of the first set of pixels, the highest level of similarity between the first disparity map, the second disparity map, and a third disparity map created at the third node.

16. The one or more computer-readable storage media of claim 15, the sequences of instructions further comprising instructions that, when executed by said one or more hardware processors, cause:
creating, at the first node, a final disparity map comprising the first piece and the second piece.

17. The one or more computer-readable storage media of claim 14, the first node comprising a set of cores, the sequences of instructions further comprising instructions that, when executed by said one or more hardware processors, cause:
receiving, at a first core of the set of cores, the portion of the second disparity map;
assigning the received portion to a second core of the set of cores;
creating, at the second core, the first piece of the third disparity map.

18. The one or more computer-readable storage media of claim 13, the sequences of instructions further comprising instructions that, when executed by said one or more hardware processors, cause:
based, at least in part, on determining that the first disparity map is smaller than the first image:
receiving, at the first node, the second disparity map;
creating, at the first node, a third disparity map indicating, for each pixel of the first set of pixels, the highest level of similarity between the first disparity map and second disparity map.

19. The one or more computer-readable storage media of claim 18, the first node comprising a set of cores, the sequences of instructions further comprising instructions that, when executed by said one or more hardware processors, cause:
- receiving, at a first core of the set of cores, a first portion of the second disparity map;
- assigning the first portion to a second core of the set of cores;
- receiving, at the first core, a second portion of the second disparity map;
- assigning the second portion to a third core of the set of cores.

20. The one or more computer-readable storage media of claim 13, the sequences of instructions further comprising instructions that, when executed by said one or more hardware processors, cause:
- receiving, at a third node of the distributed system of nodes, a first portion of the first image and the second image, the first portion comprising a first subset of the first set of pixels;
- receiving, at a fourth node of the distributed system of nodes, a second portion of the first image and the second image, the second portion comprising a second subset of the first set of pixels;
- shifting, at the third node, each pixel of the first subset of pixels of the first image in the uniform direction by a third number of pixels to form a first shifted portion;
- shifting, at the fourth node, each pixel of the second subset of pixels of the first image in the uniform direction by the third number of pixels to form a second shifted portion;
- overlaying each of the first shifted portion and the second shifted portion with the second image, such that each pixel of the first shifted portion and second shifted portion has a corresponding pixel in the second image;
- creating, at the first node, a third disparity map that indicates, for each pixel of the first shifted portion, a level of similarity between the pixel of the first shifted portion and the corresponding pixel in the second image;
- creating, at the fourth node, a fourth disparity map that indicates, for each pixel of the second shifted portion, a level of similarity between the pixel of the second shifted portion and the corresponding pixel in the second image.

21. The one or more computer-readable storage media of claim 13, the sequences of instructions further comprising instructions that, when executed by said one or more hardware processors, cause:
- receiving, at a first buffer of the first node, the first portion of a first disparity map created at the first node and the second portion of a second disparity map created at the second node; and
- comparing, at the first buffer of the first node, the first portion of the first disparity map created at the first node and the second portion of a second disparity map created at the second node.

22. One or more computer-readable storage media storing sequences of instructions, wherein said sequences of instructions, when executed by one or more hardware processors, cause:
- receiving, at each of a first node and a second node of a distributed system of nodes, a first image and a second image;
- assigning one or more input parameters of a set of input parameters to the first node and the second node, wherein each of the first node and the second node is assigned at least one input parameter of the set of input parameters, and wherein each input parameter defines a unique value for modifying the second image;
- applying, at the first node, an assigned input parameter to the received second image to create a first modified second image;
- applying, at the second node, an assigned input parameter to the received second image to create a second modified second image;
- comparing, at the first node, the first image and the first modified second image;
- comparing, at the second node, the first image and the second modified second image;
- creating, at the first node, a first result based on the comparing at the first node, the first image and the first modified second image;
- creating, at the second node, a second result based on the comparing at the second node, the first image and the second modified second image.

23. The one or more computer-readable storage media claim 22, the sequences of instructions further comprising instructions that, when executed by said one or more hardware processors, cause:
- based, at least in part, on determining that the first result is not smaller than the first image:
  - receiving, at the first node, a portion of the second result;
  - creating, at the first node, a first piece of a third result based on the first result and second result.

24. The one or more computer-readable storage media of claim 22, the sequences of instructions further comprising instructions that, when executed by said one or more hardware processors, cause:
- based, at least in part, on determining that the first result is not smaller than the first image:
  - receiving, at the first node, the second result;
  - creating, at the first node, a third result based on the first result and the second result.

* * * * *

UNITED STATES PATENT AND TRADEMARK OFFICE
CERTIFICATE OF CORRECTION

PATENT NO. : 10,469,822 B2
APPLICATION NO. : 15/471710
DATED : November 5, 2019
INVENTOR(S) : Varadarajan et al.

It is certified that error appears in the above-identified patent and that said Letters Patent is hereby corrected as shown below:

On the Title Page

On page 2, Column 1, under Other Publications, Line 11, delete "Communicaitons" and insert -- Communications --, therefor.

In the Specification

In Column 6, Line 46, delete "Log wN," and insert -- LogwN, --, therefor.

In Column 15, Line 6, delete "system" and insert -- system. --, therefor.

In the Claims

In Column 20, Line 34, in Claim 23, delete "media" and insert -- media of --, therefor.

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*